Patented Apr. 2, 1929.

1,707,727

UNITED STATES PATENT OFFICE.

EDMUND P. KAMPA AND PHILIP N. HYMAN, OF MINNEAPOLIS, MINNESOTA; SAID KAMPA ASSIGNOR TO SAID HYMAN.

TOXIC AGENT.

No Drawing. Application filed June 6, 1927. Serial No. 196,997.

This invention relates to a highly efficient toxic agent for destroying and killing insects, bacteria and vermin. Such toxic agents are usually applied by atomization or vaporization, building up a lethal concentration within an enclosed air space.

In providing an efficient toxic agent several requisites must be met. The substance must be highly toxic to bacteria, insects and vermin, but still must be of such nature that danger to human life will be minimized. Furthermore, it is desirable to provide a substance which will be of non-inflammable nature or the use thereof in certain commercial institutions will be forbidden by the boards of underwriters.

Many toxic agents heretofore employed have been unsuccessful or undesirable from a commercial standpoint, because even though high in toxicity their penetrative qualities have been low, usually due to the fact that the volatility of the agent was not properly balanced in relation to the toxicity. Consequently in application within an enclosure, leakage through the walls of the enclosure would be so great that an adequate lethal concentration could not be built up or would require far too long a time to effect. On the other hand, many toxic agents have had high penetrative qualities, but their degree of toxicity has been too low to efficiently destroy insects and bacteria. In either of the above cases the time required to adequately build up a lethal concentration within an enclosure is too great for commercial purposes.

It is, therefore, the main object of this invention to provide an improved and highly efficient toxic agent of the class described, combining extremely high toxicity with the required volatility to quickly set up the necessary lethal concentration within an enclosed air space necessary to cause the destruction of bacteria, insects and vermin within a commercially desired time limit.

A further object is to provide a substance of the class described which will be non-inflammable and which moreover, although toxic to human beings, will warn humans of its presence, thereby rendering itself safe for commercial use.

These and other objects will be apparent from the following description and will be pointed out in the claims.

Our improved toxic agent comprises the combination or mixture of an intensely toxic chemical substance with a suitable volatile substance having a low degree of toxicity in which said highly toxic substance is completely dissolved. We have found that tetrachlordinitroethane $C_2(NO_2)_2Cl_4$ is many times more toxic, efficient and penetrating to insect, bacteria and animal life than chemicals such as carbondisulphide and carbontetrachloride and much more toxic than hydrocyanic acid gas. The tetrachlordinitroethane is obtained in solid form, usually in crystals or powder, and although it will be converted slowly into gaseous state when subjected to the atmosphere the time required is so great because of its low volatility that alone it will be unsuitable as a toxic agent of the class desired.

We have found through extensive research that tetrachlordinitroethane may be completely dissolved in several of the volatile solvents of the paraffin hydrocarbon series and especially in the halogen derivatives thereof. These solvents are desirable for the reason that they are highly volatile and non-inflammable and furthermore have some degree of toxicity although relatively low as compared to the intensely toxic tetrachlordinitroethane. While it is understood that other solvents in the hydrocarbon paraffin series may be employed dichlorethane $C_2H_4Cl_2$, trichlorethane $C_2H_3Cl_3$ and tetrachlorethane $C_2H_2Cl_4$ were found entirely satisfactory. All of the solvents or vehicles above mentioned are obtained in liquid form, and of high volatility. When the solid tetrachlordinitroethane is dissolved in any of said solvents the mixture will constitute a highly efficient, extremely toxic agent which will concentrate the air within an enclosure very rapidly and which will almost immediately destroy bacteria, insects and animal life. The toxic agent will have substantially the toxic properties of the tetrachlordinitroethane with the volatility of the solvent.

The proportion of the ingredients will be considerably varied to meet the requirements. Thus, if it is desired to produce a lethal concentration within an enclosure having extremely high toxicity a greater proportion of the tetrachlordinitroethane will be dissolved in the solvent, while in destroying insects and bacteria on plant life, where a lower toxicity is desired to prevent destruction to the plant life a substantially greater proportion of the solvent will be utilized. No definite proportion of ingredients can, therefore, be given, although in most cases 20 to 40 parts, by weight, of the tetrachlordinitroethane are used and 60 to 80 parts, by weight, of the solvent. The mixture is not readily inflammable and will be acceptable to the fire underwriters.

Ordinarily in setting up a lethal concentration within an enclosure our solution is atomized or vaporized, penetrating the entire enclosure very quickly and possessing an intense toxicity to insects, bacteria and vermin. The vapor or fumes have a remarkably strong lachrymating effect upon human beings even when in a sub-lethal concentration. Consequently, humans will be warned of its presence, and will of necessity remove themselves therefrom before any harmful effects from the toxins will take place.

It will, of course, be understood that we do not limit ourselves to the precise proportions of the ingredients set forth or to the use of any one ingredient as a solvent, but contemplate the use of volatile non-inflammable hydrocarbon ingredients in the paraffin series.

What is claimed is:

1. A toxic agent comprising a solution of tetrachlordinitroethane in a volatile hydrocarbon solvent.

2. A toxic fumigant comprising a solution of tetrachlordinitroethane in a volatile hydrocarbon solvent of the paraffin series.

3. A toxic fumigant comprising a solution of tetrachlordinitroethane in ethylene dichloride.

4. A toxic fumigant comprising a solution of less than 50% by weight, of tetrachlordinitroethane in more than 50% by weight of ethylene dichloride.

5. A toxic fumigant comprising a solution of tetrachlordinitroethane in a volatile non-inflammable halogen derivative of the hydrocarbon paraffin series.

In testimony whereof we affix our signatures.

EDMUND P. KAMPA.
PHILIP N. HYMAN.